R. P. WILLIAMS.
Derrick-Stake.
No. 212,775.  Patented Feb. 25, 1879.
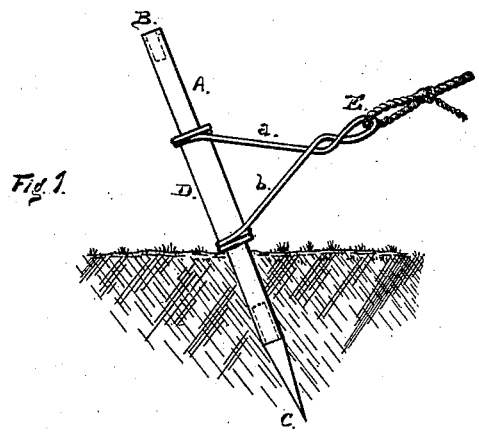
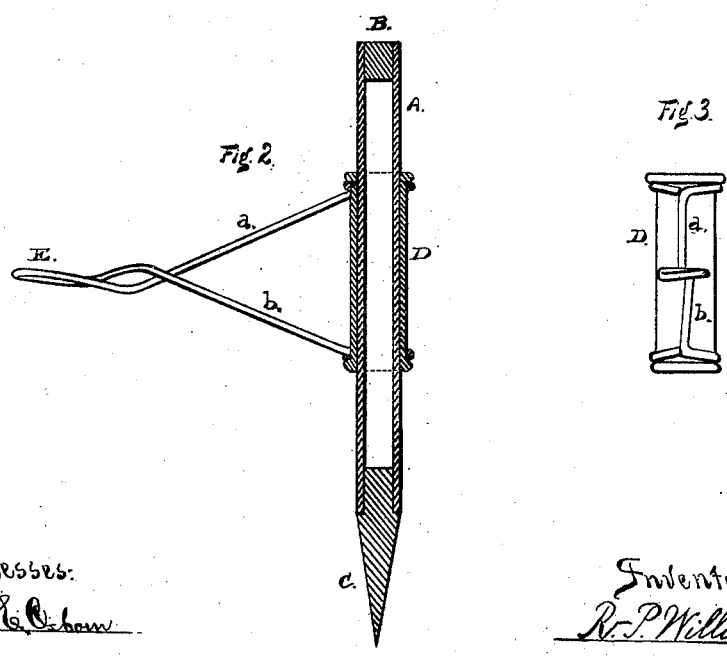

UNITED STATES PATENT OFFICE.

R. P. WILLIAMS, OF ALAMEDA, CALIFORNIA, ASSIGNOR OF ONE-HALF HIS RIGHT TO THOMAS WHITE, JR., OF SAME PLACE.

IMPROVEMENT IN DERRICK-STAKES.

Specification forming part of Letters Patent No. 212,775, dated February 25, 1879; application filed December 30, 1878.

*To all whom it may concern:*

Be it known that I, R. P. WILLIAMS, of Alameda, in the county of Alameda and State of California, have invented a new and useful Improvement in Derrick-Stakes, which invention is fully set forth and described in the following specification and accompanying drawings.

This invention has for its object to construct an improved metal stake for anchoring derricks, tents, engines in the field, and other machinery and structures, which is to be used in lieu of the wooden stakes, as affording greater security against breakage or withdrawal from the ground, and as being much stronger, cheaper, and more durable.

It consists of a metal tube or length of pipe of small diameter, with the upper end closed by a cap or plug to receive the blows of the instrument in driving it, and with its lower end provided with a steel or solid iron point, sufficiently sharp to penetrate the ground, and to facilitate the work of driving. Upon this stake is placed and slipped a metal thimble, movable up and down upon it, which serves to connect the rope or cable to the stake, this thimble being provided with diagonally-extending rods or arms, that meet at a point equidistant from the ends of the thimble, and terminate in a holding ring or loop. To this ring the rope or cable is secured.

Referring to the accompanying drawings, Figure 1 is an elevation of my invention in position, showing the guy-rope secured to the holding-ring of the thimble. Fig. 2 is an elevation in section. Fig. 3 is a detail view of the thimble.

A represents the stake proper; B, the plug that closes the end and receives the blows in driving it in place in the ground; and C is the solid point inserted into and secured to the lower end. The stake is made of two-inch gas-pipe or tubing, cut to the required length. In the upper end is fixed the cap or plug, and in the lower end is driven and secured the metal point. This latter is made from a solid piece of steel or iron, and is provided with a shoulder or an end of reduced diameter to fit into and receive the end of the stake-tube. These two parts may be united by a screw-joint.

D represents a movable thimble, made of a metal tube of suitable size to slip easily upon the stake, and provided with rods or arms extending from each end diagonally outward and toward each other, and meeting at a point equidistant, where they terminate in a ring or loop, E. This ring E is the connecting-point for the rope or cable, and the two rods $a\ b$ serve to communicate and distribute the strain or pull equally upon both ends of the thimble, which in turn throws the strain uniformly upon the stake throughout its length and perpendicularly to its position in the ground.

By the action of this thimble there is less danger of the stake being turned over by the diagonal strain upon the upper end, and there is no liability of the rope slipping from the stake. The pull or strain of the rope is resisted at several points along the length of the stake instead of at a single point alone, as in the case of the ordinary mode of tying the rope to the stake.

With this thimble a stake will sustain a greater weight or strain. It is also of service in governing the depth to which the stake is to be driven. By placing it over the stake it will serve as a stop to the driving-instrument, and prevent the stake being driven in too far.

Having thus described my invention, what I claim, and desire to secure by Letters Patent, is—

1. A hollow metal stake, A, provided with a cap or plug at one end, and a fixed point at the other end, substantially as described, for the purposes set forth.

2. In combination with a driven stake, a movable thimble, D, provided with guy rods or arms $a\ b$ and a ring or loop, substantially as described and specified.

In testimony that I claim the foregoing I have hereunto set my hand and seal this 20th day of November, 1878.

R. P. WILLIAMS. [L. S.]

Witnesses:
WM. S. CAMPBELL,
C. W. M. SMITH.